Oct. 3, 1961  S. F. PASTURCZAK  3,002,585
ROTARY AIR SCREEN
Filed Sept. 22, 1960  3 Sheets-Sheet 1

INVENTOR.
S. F. PASTURCZAK

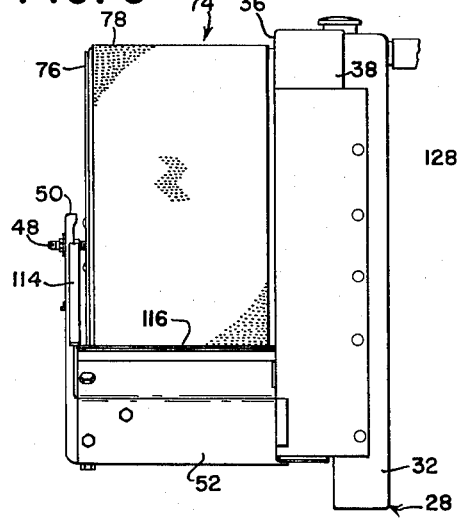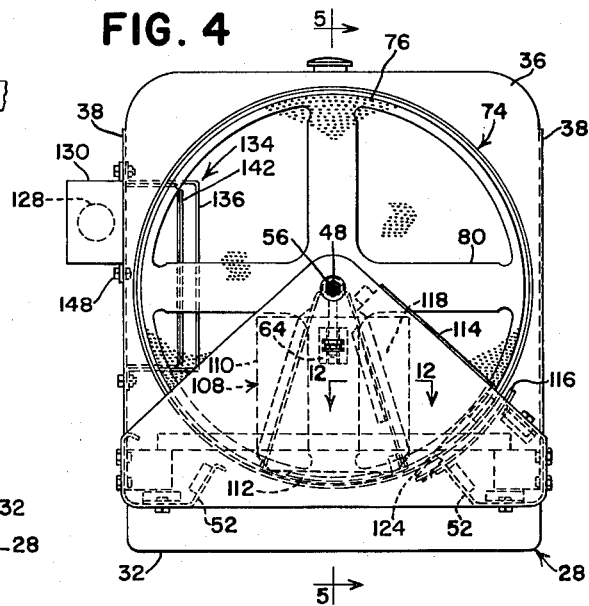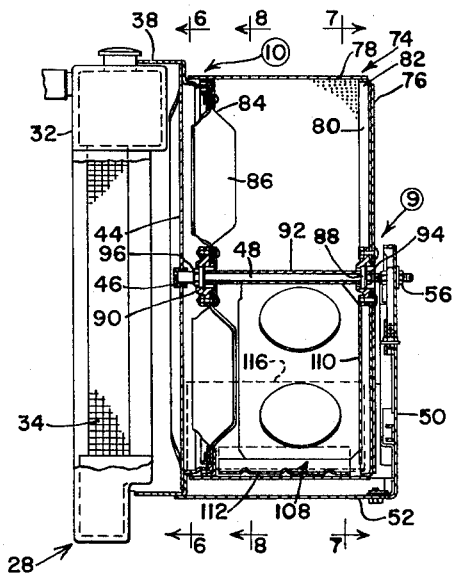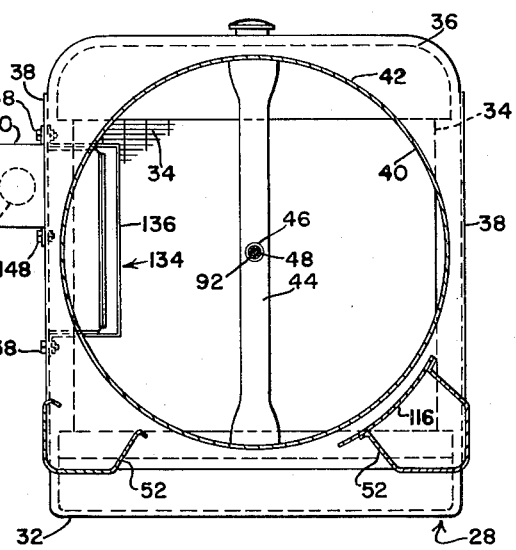

Oct. 3, 1961 S. F. PASTURCZAK 3,002,585
ROTARY AIR SCREEN
Filed Sept. 22, 1960 3 Sheets-Sheet 3

INVENTOR.
S. F. PASTURCZAK

United States Patent Office 3,002,585
Patented Oct. 3, 1961

3,002,585
ROTARY AIR SCREEN
Stanley F. Pasturczak, East Moline, Ill., assignor to Deere & Company, Moline, Ill., a corporation of Delaware
Filed Sept. 22, 1960, Ser. No. 58,607
9 Claims. (Cl. 183—34)

This invention relates to air cleaning means and more particularly to a rotary screening device particularly adapted for use in conjunction with the air cooling systems of internal combustion engines.

The use of water-cooled internal combustion engines on agricultural implements and other machinery of the type operating in extremely dusty and similar conditions presents problems of clogging of the radiator core or other screen devices used in conjunction therewith, and various specially constructed cleaning devices have been resorted to to supplement conventional screens. In one of these, the screen is provided in the form of a rotary device driven by air current induced by the engine fan or by some other means, and an internal portion of the device carries a baffle which in effect blanks off part of the surface of the screen so as to create a pressure drop therein, the theory being that foreign particles accumulated by the screen during rotation thereof will be caused to drop off when the screen passes the fixed baffle. A typical example of such rotary screen is shown in the U.S. Patent to Traviss 1,860,697. However, the basic structure is subject to certain disadvantages, recognized primarily in attempting to keep the screen clean in the operation of combines in wheat fields and the like, because of the tendency of chaff to accumulate and adhere to the screen despite the use of the blanking baffle.

According to the present invention, these disadvantages are eliminated by the provision of additional baffle means in conjunction with the blanking baffle which operate to create air turbulence in such areas as to improve the performance of the blanking baffle means, whereby the adhering chaff is more readily disposed of. It is a further object of the invention to provide an improved rotary screen device that may be readily attached to the radiator of an internal combustion engine and which, with minor modifications, may be utilized in conjunction with other devices requiring an air-cleaning function of the character noted. The invention has as another important aspect thereof the provision of means whereby cleaned air may be taken out of the air stream for use in the intake system of an internal combustion engine.

The foregoing and other important objects and desirable features inherent in and encompassed by the invention will become apparent as a preferred embodiment thereof is disclosed in detail in the ensuing description and accompanying sheets of drawings, the several figures of which are described below.

FIG. 3 is an elevational view of the device as seen from the side opposite to that shown in FIG. 2.

FIG. 4 is a front view of the device.

FIG. 5 is a fragmentary section, with portions broken away, as seen generally along the line 5—5 of FIG. 4.

FIG. 6 is a section as seen along the line 6—6 of FIG. 5.

Figure 1:
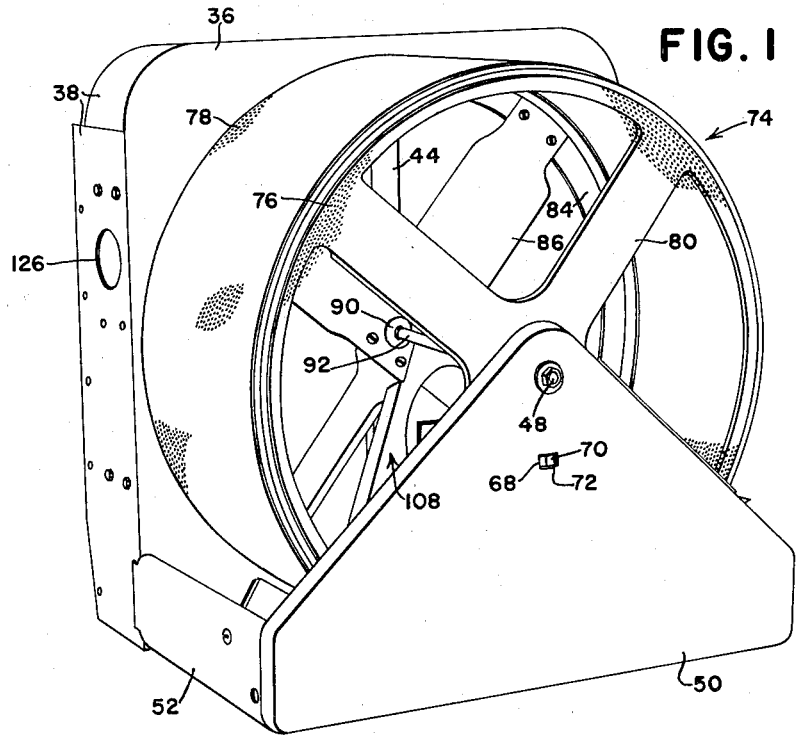
FIG. 1 is a perspective of the screening device as seen by itself.
Figure 2:
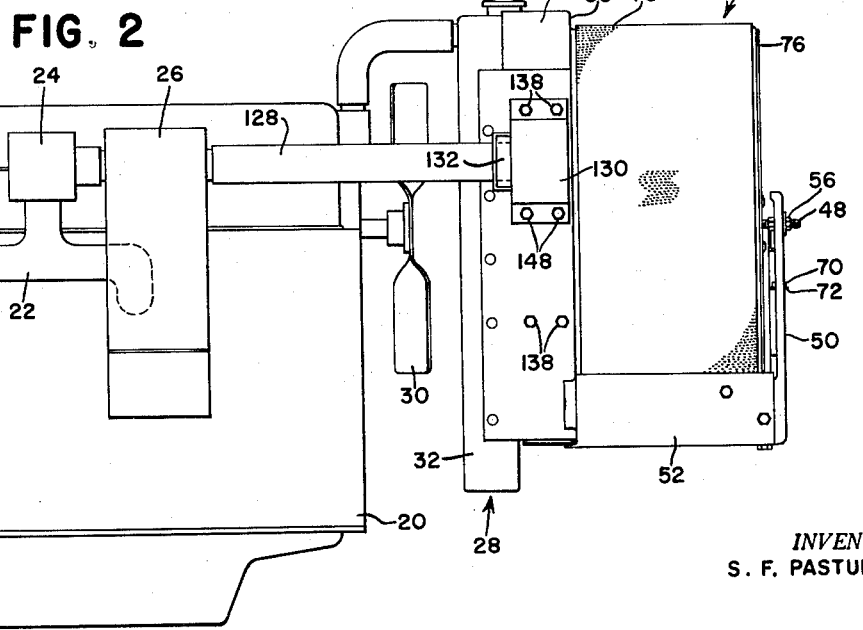
FIG. 2 is a side elevation showing the screening device, drawn to a reduced scale, associated with a typical internal combustion engine.

As already indicated, the invention finds particular utility in conjunction with internal combustion engines and for that purpose it will be described in that environment here; although, it will be recognized that the broader principles of the invention are applicable in other environments. Accordingly, for purposes of illustration, an internal combustion engine is represented generally by the numeral 20 as having an intake system including a manifold 22, a carburetor 24 and an air cleaner 26, which may be of any conventional construction. Disposed ahead of the engine is a typical coolant radiator 28, and an engine fan 30 operates behind the radiator to draw cooling air therethrough, in conventional fashion. The fan of course rotates on a fore-and-after horizontal axis. Here, as elsewhere, the expressions "front," "rear" and so forth are used as terms of convenience, since the position of the engine as among different vehicles or machines may, of course, vary.

The radiator 28 is typically made up of marginal portions establishing a shell 32 surrounding a radiator core 34 (FIG. 5), and the whole is representative of what might be regarded as support means on which the rotary screen device, to be presently described, is mounted.

The rotary screen device is here shown as having a basic mounting part in the form of an upright plate 36 of relatively heavy gauge sheet metal or the like. This plate is so shaped as to overlie the front of the marginal portions or shell 32 of the radiator, and, to further improve the substantially air-tight relationship between the plate and the radiator shell, the plate has integrally or otherwise formed therewith rearwardly projecting marginal flange portions 38. As best seen in FIG. 6, the plate has therein a circular opening 40 of substantial area which is in register with a coincident area of the radiator core 34 so that as the engine fan operates to create an air stream moving rearwardly toward the core, the air stream will pass through the opening 40 and thence through the area of the core coincident with that opening. The plate is further formed with an annular sealing flange 42 projecting forwardly from the opening for purposes to presently appear. The opening is partially interrupted by the provision therein of a cross brace or hanger 44 of relatively narrow dimensions. This brace or hanger is provided at its center, or on the axis of the opening 40, with a bushing 46 for supporting the rear end of a shaft 48.

The forward end of the shaft is carried in an upright sheet metal front support 50 which is here shown as being of generally triangular shape, having its base portion rigidly secured to a pair of fore-and-aft sheet metal supports 52, each of which is rigidly secured to the lower portion of the plate 36. Certain of the supporting connections are effected by spot welding, for example, and in other instances bolts are used, but these details are not sufficiently important to require specific description.

The upper portion of the support 50 in which the front end of the shaft 48 is received is provided with a vertically elongated opening 54 through which the front end of the shaft is initially loosely received, and the terminal end of the shaft is threaded to receive a nut 56 behind which is disposed a washer 58. Behind the support plate 50, the shaft 48 carries an eye-bolt 60 and behind this a jam nut 62 is threaded on the shaft. A clip 64, which is U-shaped in plan, is welded or otherwise rigidly secured to the back surface of the plate 50. The lower end of the eye-bolt 60 is threaded and extends through the opening provided between the clip 66 and the plate 50, carrying an adjusting nut 70 and washer 72 which projects through the opening 66—68 so that when the nut 56 is loosened, the nut 70 may be turned to react via the washer 72 against the marginal edges of the opening 66—68 to effect vertical adjustment of the front portion of the shaft 48, it being recognized that the mounting of the rear bushing 46 is such as to permit this type of adjustment. When proper coaxiality has been obtained, the nut 56 can be tightened.

The shaft 48 serves to journal the rotary screen device, indicated in its entirety by the numeral 74.

This device is in the form of a generally cylindrical drum having a circular front radial foraminous wall 76 and an annular cylindrical foraminous wall 78. Each of these walls may be formed of any suitable screen material. That shown is of perforated sheet metal; although, it will be appreciated that other forms of screen material may be used, depending upon such characteristics as rigidity and the general assembly on which the screen work is carried. The drum has a front spoked wheel or support 80 to which the front screen wall 76 may be spot welded or otherwise secured, and this wheel is peripherally flanged at 82 (FIG. 5) to carry the front marginal portion of the cylindrical screen wall 78 (FIG. 5). A rear spoked wheel 84, the spokes of which are in the form of fan blades 86, appropriately carries the rear marginal portion of the cylindrical screen wall 78. The wheels 80 and 84 have their central portions or hubs journaled respectively on bearings 88 and 90 mounted on the shaft 48 and spaced apart by a concentric sleeve 92. Front and rear nuts 94 and 96 secure the axial position of the drum 74, and it will be seen that the drum is free to rotate about the axis of the shaft 48. In this case, rotation is effected by the air stream induced by rotation of the engine fan 30, which is clockwise as seen in FIGS. 1, 4, 6, and 8. The drum 74 will rotate in the same direction. As previously stated, other means could be used to cause rotation of the screen; however, it is found that the fan-induced means is adequate.

Figure 10:
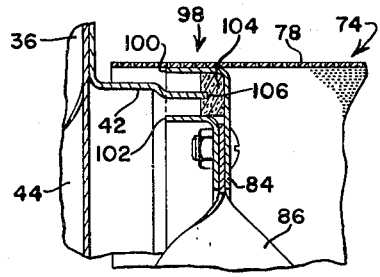
FIG. 10 is an enlarged fragmentary section showing that portion of the structure indicated by the arrow bearing encircled numeral 10 in FIG. 5.
Figure 11:
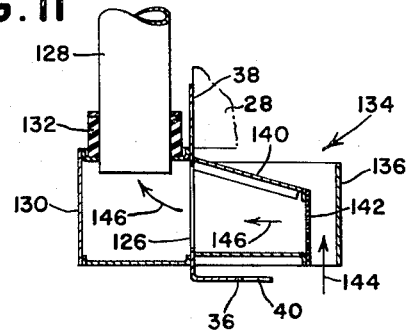
FIG. 11 is an enlarged section on the line 11—11 of FIG. 8.

The junction of the rear wheel 84 with the rear marginal portion of the cylindrical screen wall 78 is provided with a substantially air-tight seal indicated generally by the numeral 98 and best shown in FIG. 10. The previously referred to annular lip or flange 42 is received in a channel effected by flange portions 100 and 102 on the drum 74, and a ring of felt, rubber composition, or the like, indicated at 104, is carried in the channel and is preferably grooved at 106 to receive the front marginal portion of the lip 42. Hence, on the basis of the substantially air-tight seal provided in the area just indicated and the further substantially air-tight junction between the plate 36 and the radiator shell, the stream of air moving through the radiator core will pass wholly through the screen walls 76 and 78. The perforations in these walls are relatively minute and consequently are effective to screen out such foreign particles as chaff, leaves, stems and the like, commonly found in operations peculiar to the agricultural field. However, portions of these foreign particles will be found to have varying dimensions. Some of them are long and silky and others are relatively broad, and consequently the accumulation thereof on the screen drum ultimately reaches such proportions as to completely block all the perforations and thus to inhibit air flow, resulting in overheating of the engine. For this reason, there is provided internal baffle means indicated in its entirety by the numeral 108, which is effective to blank off a portion of the area of the screen so as to create a low-pressure area effective to cause removal of the accumulation from the screen as the screen passes the area occupied by the baffle means. The internal baffle means comprises an internal front radial baffle 110 and an internal arcuate or partly circumferential baffle 112. The baffle means is in the form of a triangular element secured to the sleeve 92 and thus suspended therefrom, in this case in fixed relation, since the sleeve is held between the front and rear nuts 94 and 96. Consequently, the baffle means 108 always occupies the same position and, as the screen passes the baffle means, the consecutive areas of the screen walls 76 and 78 that pass respectively over the baffles 110 and 112 are blanked off from the air stream and the low pressure area thus created, plus the effects of centrifugal force, causes the chaff and other accumulation to fall off of the screen walls. However, as already indicated, the efficiency of this arrangement is relatively low and accordingly the present invention provides means to materially improve the efficiency.

Figure 7:
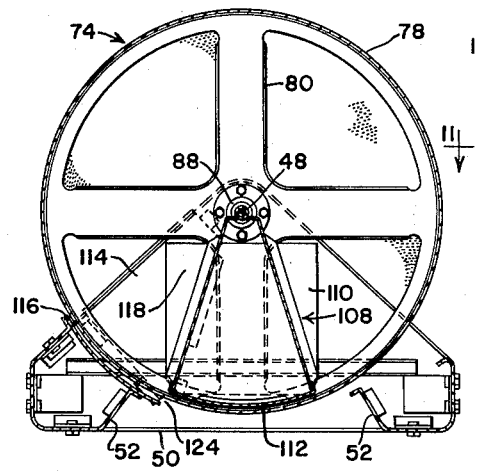
FIG. 7 is a section on the line 7—7 of FIG. 5.
Figure 8:
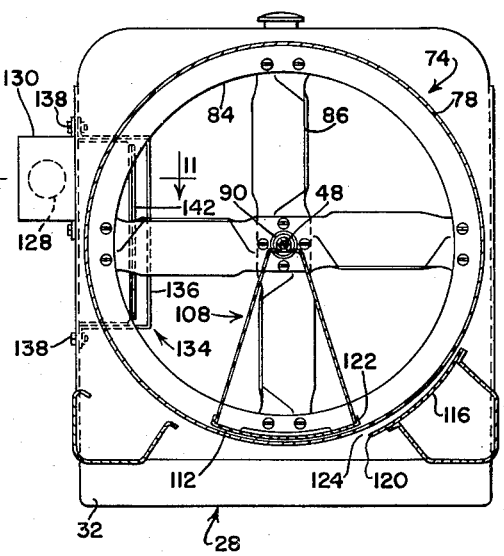
FIG. 8 is a section on the line 8—8 of FIG. 5.
Figure 9:
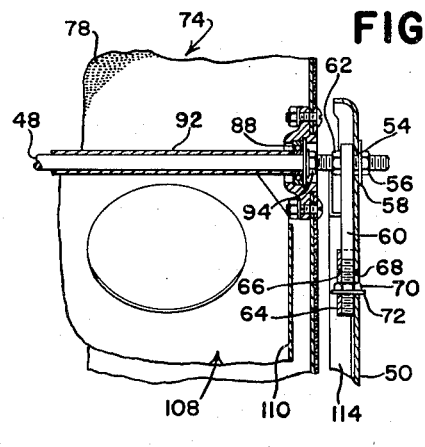
FIG. 9 is an enlarged fragmentary section of that portion of the structure shown by the arrow bearing the encircled numeral 9 in FIG. 5.
Figure 12:
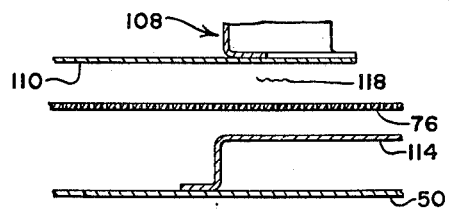
FIG. 12 is an enlarged fragmentary section generally along the line 12—12 of FIG. 4.

This means takes the form of external baffle means, here including an external front radial baffle 114 and an arcuate or partly circumferential external baffle 116. The front external radial baffle 114 is generally triangular in shape and is secured to the front support plate 50 in such a manner that a portion thereof overlaps the area occupied by the proximate portion of the internal baffle 110. It will be appreciated, of course, that the baffle 110 is behind the front screen wall 76 and the external baffle 114 is ahead of this screen wall (FIG. 12). There is thus provided an area, generally indicated by the numeral 118, in which air turbulence is created to improve the departure of chaff from the front screen 76 as it passes the combination baffle 110—114. See also FIGS. 4 and 7.

Likewise, further means for creating air turbulence is effected by the combination of the baffles 112 and 116. Here again, the baffle 112 is inside the drum and the baffle 116 is outside the drum. The relationship between these two baffles may be seen best in FIG. 8, in which will be seen that the baffle 116 is angularly offset relative to the baffle 112 in a direction counter to the direction of rotation of the drum, which has been previously indicated to be clockwise. Thus, there is a marginal edge 120 on the baffle 116 which is proximate to a marginal edge portion 122 on the internal baffle 112. These two edges are additionally offset radially to provide a general area 124 in which air turbulence has the effect of improving the removal of chaff and other accumulation from the outer surface of the cylindrical screen wall 78 during rotation of the drum.

It is a further feature of the invention that means is provided for taking off a portion of the cleaned air for use in the engine intake system, here represented as having the previously described components 22, 24 and 26. For this purpose, one of the marginal flanges 38 on the plate 36 has therein a circular aperture 126 by means of which a connection is made to a pipe 128 which leads to the air cleaner 26. This connection takes the form of a box 130 into which the forward end of the pipe 128 extends, the box being in register with the opening 126 and the pipe 128 being sealed relative to the box by any appropriate seal 132. Internally of the screening device, in a portion of the space between the front of the radiator and the rear surface of the plate 36, there is mounted a pre-cleaner represented in its entirety by the numeral 134. This pre-cleaner takes the form of a U-shaped member 136, appropriately secured, as by bolts 138, to the inner face of the previously indicated flange 38. This member is closed at its top and bottom and at its inner side but is open fore and aft. Within the member is a second member 140 which is closed about all of its faces except the outer face in register with the opening 126 and its inner face, which carries a screen 142. The screen 142 is spaced inwardly from the upright portion of the member 136. The member 140 may be preassembled with the member 136. As will be seen, the air stream flowing through the space between the screen 142 and the proximate portion of the member 136 is represented by the arrow 144. The air stream represented by the take-off of cleaned air through the pipe 128 is represented by the arrows 146. Thus, the take-off air is transverse to the general air stream at 144 and any foreign particles that happen to get through the drum screen have a tendency to be carried rearwardly in the direction of the arrow 144, since they do not readily change direction, according to the arrows 146. Portions that tend to "turn the corner" will be screened out by the screen 142. The pre-cleaner 144 occupies, as will be seen, only a minimum portion of the frontal area of the plate opening 40 and thus does not materially interfere with flow of coolant air for the radiator.

The outer box 130 may be secured to the flange 38 partly by means of the bolts 138 previously described and partly by means of additional bolts, such as those shown at 148. The details of the pre-cleaner may be departed from without sacrificing the principle of taking off part of the cleaned air from behind the drum 74 for use in the air intake system.

Features and advantages other than those enumerated and specifically outlined will readily occur to those versed in the art, as will many modifications and alterations in the preferred embodiment disclosed, all of which may be achieved without departure from the spirit and scope of the invention.

What is claimed is:

1. For use with apparatus having upright means including marginal portions defining a frontal opening and means operative to create an air stream moving toward and rearwardly through said frontal opening: an air screening device comprising support means including an upright plate closely ahead of and overlying the upright means and affixed to said marginal portions but having therein a circular opening in register with a substantial portion of said frontal opening; a rotary screen in the form of a drum disposed coaxially ahead of and in substantial register with the circular opening so as to intercept foreign particles in the air stream, said drum having a foraminous front circular radial wall spaced ahead of the plate and a foraminous cylindrical wall joined to and extending rearwardly from said front wall to a rear marginal edge having a substantially airtight rotary seal with that portion of the plate that defines said circular opening; means journaling the drum on the support means for rotation about its axis; means operative to rotate the drum; fixed internal means within the drum for blanking out a portion of each of the drum front and cylindrical walls of the drum from the air stream, including an imperforate internal radial baffle closely rearwardly of the front wall and of materially smaller area than said front wall and an imperforate arcuate baffle secured to said radial baffle and disposed closely inwardly of and of materially smaller area than said cylindrical wall; and fixed external means including an imperforate external radial baffle disposed closely ahead of the radial wall and angularly offset from the internal radial baffle in a direction counter to the direction of rotation of the drum, and an external arcuate baffle closely spaced from the cylindrical wall of the drum and angularly offset from the internal arcuate baffle in a direction counter to the direction of rotation of the drum.

2. The invention defined in claim 1, in which: a portion of the external radial baffle is disposed in angularly overlapping relation to a portion of the internal radial baffle.

3. The invention defined in claim 1, in which: the internal arcuate baffle has a fore-and-aft edge disposed at that side thereof counter to the direction of rotation of the drum and the external arcuate baffle has a fore-and-aft edge closely proximate to said first mentioned edge, said external arcuate baffle extending from said second mentioned edge in the aforesaid counter-rotational direction.

4. The invention defined in claim 1, in which: a portion of the external radial baffle is disposed in angularly overlapping relation to a portion of the internal radial baffle, the internal arcuate baffle has a fore-and-aft edge disposed at that side thereof counter to the direction of rotation of the drum and the external arcuate baffle has a fore-and-aft edge closely proximate to said first mentioned edge, said external arcuate baffle extending from said second mentioned edge in the aforesaid counter-rotational direction.

5. The invention defined in claim 1, in which: the support means includes a front support closely ahead of and of materially smaller area than that of the front wall of the drum; the means journaling the drum is carried at least in part on said front support; and the external baffles are carried by said front support.

6. The invention defined in claim 1, in which: the support means includes a front support closely ahead of and of materially smaller area than that of the front wall of the drum; the means journaling the drum includes an element coaxial with the drum and proximate to said front support; and means is operative between said front support and said element for adjusting said element to correctively vary the axis of the drum.

7. The invention defined in claim 1, in which: the plate has a rearwardly projecting peripheral flange joined in substantially air-tight relation to said marginal portions and spacing the plate ahead of said upright means and a portion of said flange has an additional air outlet opening therein for taking off a portion of cleaned air behind said plate.

8. For use with an internal-combustion engine having an upright radiator including a marginal shell around a core and means operative to create an air stream moving toward and rearwardly through said core: an air screening device comprising support means including an upright plate closely ahead of and overlying the radiator and affixed to said shell but having therein a circular opening in register with a substantial portion of said core; a rotary screen in the form of a drum disposed coaxially ahead of and in substantial register with the circular opening so as to intercept foreign particles in the air stream, said drum having a foraminous front circular radial wall spaced ahead of the plate and a foraminous cylindrical wall joined to and extending rearwardly from said front wall to a rear marginal edge having a substantially air-tight rotary seal with that portion of the plate that defines said circular opening; means journaling the drum on the support means for rotation about its axis; means operative to rotate the drum; fixed internal means within the drum for blanking out a portion of each of the front and cylindrical walls of the drum from the air stream, including an imperforate internal radial baffle closely rearwardly of the front wall and of materially smaller area than said front wall and an imperforate arcuate baffle secured to said radial baffle and disposed closely inwardly of and of materially smaller area than said cylindrical wall; and fixed external means including an imperforate external radial baffle disposed closely ahead of the radial wall and angularly offset from the internal radial baffle in a direction counter to the direction of rotation of the drum, and an external arcuate baffle closely spaced from the cylindrical wall of the drum and angularly offset from the internal arcuate baffle in a direction counter to the direction of rotation of the drum.

9. The invention defined in claim 8, in which: the plate has a rearwardly projecting peripheral flange joined in substantially air-tight relation to said shell and spacing the plate ahead of said upright means and a portion of said flange has an additional air outlet opening therein for taking off a portion of cleaned air behind said plate for the air intake system of the engine.

References Cited in the file of this patent

UNITED STATES PATENTS

| | | |
|---|---|---|
| 1,860,697 | Traviss | May 31, 1932 |
| 2,036,534 | Muirhead | Apr. 7, 1936 |
| 2,661,810 | Heth | Dec. 8, 1953 |
| 2,823,656 | Dolza | Feb. 18, 1958 |